United States Patent [19]

Roussel

[11] Patent Number: 4,924,166
[45] Date of Patent: May 8, 1990

[54] CIRCUIT FOR SHAPING AND MAKING USE OF ARMATURE CURRENT RIPPLE AS GENERATED BY A D.C. MOTOR, IN PARTICULAR FOR POSITION CONTROL

[75] Inventor: Pierre Roussel, Neuilly Sur Seine, France

[73] Assignee: Jaeger, Levallois-Perret, France

[21] Appl. No.: 323,959

[22] Filed: Mar. 14, 1989

[30] Foreign Application Priority Data

Mar. 15, 1988 [FR] France ............................. 88 03325

[51] Int. Cl.⁵ .............................................. H12P 5/16
[52] U.S. Cl. .................................... 318/608; 388/813; 388/817
[58] Field of Search .............. 388/813, 817, 814, 922, 388/903, 910, 911, 912; 318/608

[56] References Cited

U.S. PATENT DOCUMENTS

| | | | |
|---|---|---|---|
| 4,002,962 | 1/1977 | Miller | 388/813 |
| 4,078,194 | 3/1978 | Johnson, Jr. | 388/817 |
| 4,307,324 | 12/1981 | Regnier | 388/813 |
| 4,370,677 | 1/1983 | Baldwin et al. | 388/813 |
| 4,420,715 | 12/1983 | LeCourtier et al. | 388/819 |
| 4,564,795 | 1/1986 | Parkes et al. | 388/813 |
| 4,639,649 | 1/1987 | Seto | 388/813 |
| 4,712,853 | 12/1987 | Howard | 388/817 |

*Primary Examiner*—William M. Shoop, Jr.
*Assistant Examiner*—Paul Ip
*Attorney, Agent, or Firm*—Blakely, Sokoloff, Taylor & Zafman

[57] ABSTRACT

The present invention provides a circuit for shaping ripple in the armature current of a D.C. motor. The circuit includes a phase-locked loop (100). In addition, the circuit preferably includes a back-e.m.f. circuit (300) suitable for generating a signal proportional to the back-e.m.f. of the motor and for controlling the frequency of the phase-locked loop (100) on the basis of the signal obtained in this way and/or the back-e.m.f. circuit (300) suitable for generating a signal proportional to the back-e.m.f. of the motor, a voltage controlled oscillator (500) controlled by the signal proportional to the back-e.m.f., and a switched capacitor filter (400) controlled by the output of the oscillator (500), the filter being connected upstream from the phase-locked loop (100).

20 Claims, 6 Drawing Sheets

FIG_1

FIG_2

FIG_3
PRIOR ART

FIG_4
PRIOR ART

FIG_5

FIG_6

FIG_7

FIG_8

FIG_9

FIG_10

CIRCUIT FOR SHAPING AND MAKING USE OF ARMATURE CURRENT RIPPLE AS GENERATED BY A D.C. MOTOR, IN PARTICULAR FOR POSITION CONTROL

The present invention relates to circuits for controlling D.C. motors.

The object of the present invention is to provide means for shaping armature current ripple as generated by a D.C. motor for subsequent use for controlling the positioning of a moving member driven by the motor, e.g. by counting the ripples.

BACKGROUND OF THE INVENTION

French patent document FR-A-2 585 200 proposes detecting the periodic component in the armature feed current of a D.C. motor and counting the number of periods in said periodic component in order to monitor the position of the armature and thus the position of a moving member associated therewith. The periodic component in the armature current is generated by the periodic switching of the commutator brushes. The number of armature current oscillations generated from a known reference position is therefore directly representative of the instantaneous position of the motor. The principle outlined in document FR-A-2 585 200 is attractive in theory since it enables position to be controlled without requiring auxiliary sensors such as optical sensors, Hall effect sensors, or the like, which are conventionally used for monitoring the position of the motor.

In the context of the motor industry, by way of non-limiting example, armature current ripple counts can be used for monitoring the positions of moving members such as rearview mirrors, seats, steering wheels, air conditioning controls, . . . .

However, in practice it is observed that the armature current of a D.C. motor includes a large amount of interference.

Figure 1:
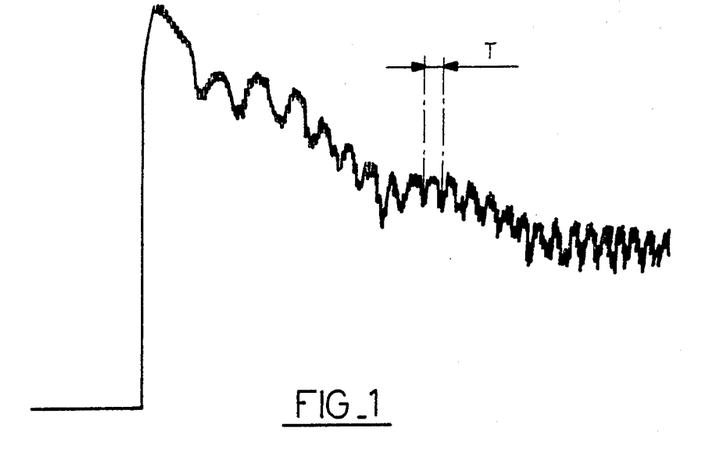
FIGS. 1 and 2 are waveform diagrams showing the armature current of a D.C. motor, as described above.
Figure 2:
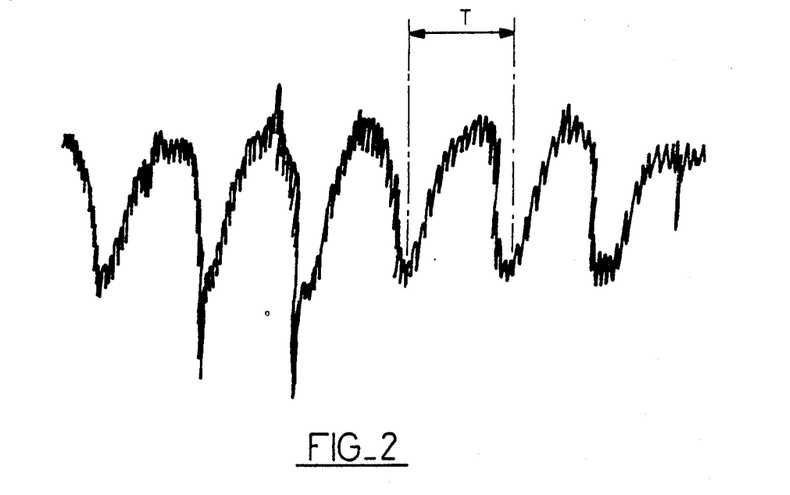

Accompanying FIG. 1 shows the armature current of a D.C. motor during a start-up stage, and accompanying FIG. 2 is on a larger scale and shows the armature current of a D.C. motor while running normally. After a start-up stage during which a current surge is drawn by the armature circuit of the motor, current stabilizes in normal operation about a value which is practically constant for any given motor mechanism, with a periodic component generated by commutator switching being superposed on the substantially constant value. The period of this component is referenced T in accompanying FIGS. 1 and 2.

On examining FIGS. 1 and 2, it can be seen that the armature current also includes a large amount of random interference (harmonics and/or artifacts). If this interference is taken into account by the counting means, then the count of the number of oscillation periods in the armature current will be wrong, and thus the position will also be wrong.

Figure 3:
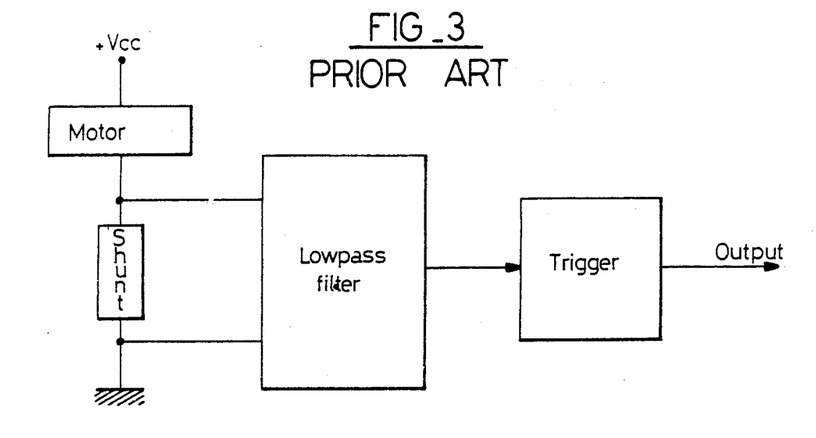
FIGS. 3 and 4 are described above and relate to the prior art.

An attempt has been made to eliminate the interference superposed on the armature current of a D.C. motor by means of the circuits shown in accompanying FIG. 3, where a signal representative of the armature current is taken from the terminals of a shunt resistance connected in series with the armature, is filtered by a low pass filter, and the filtered signal is applied to a trigger stage.

However, the circuit shown in FIG. 3 remains highly sensitive to harmonics and to large amplitude interference. The error rate in counting the ripples in the armature current varies between 1% and 30% depending on the state of the motor and on the electromagnetic environment.

The object of the present invention is to eliminate this drawback.

SUMMARY OF THE INVENTION

To this end, the invention proposes integrating a phase-locked loop in the circuit for shaping the armature current ripple as generated by a D.C. motor.

The Applicant has observed that it is possible to minimize errors in counting the oscillation periods by using a phase-locked loop.

In accordance with another feature of the invention, the shaping circuit includes a lowpass filter placed upstream from the phase-locked loop.

In accordance with another advantageous feature of the invention, the shaping circuit includes means suitable for generating a signal proportional to the back-e.m.f. of the motor and for controlling the frequency of the phase-locked loop on the basis of the signal obtained in this way.

In accordance with another advantageous feature of the invention, the shaping circuit includes means for generating a signal proportional to the back-e.m.f. of the motor, a voltage controlled oscillator controlled by the signal proportional to the back-e.m.f., and a switched capacitor filter controlled by the oscillator output and placed upstream from the phase-locked loop. The switched capcitor filter may be a lowpass filter or a bandpass filter. Thus, the signal applied to the input of the phase-locked loop passes through a filter whose cut-off frequency is controlled to be proportional to the speed of rotation of the motor since its back-e.m.f. is proportional to said speed (back-e.m.f.=k.$\phi$w, where k=a constant, $\phi$=flux, and w=speed of rotation of the motor). As a result the harmonics at the input to the phase-locked loop are always attenuated regardless of the speed of rotation of the motor.

The present invention also provides a circuit for making use of the current ripples generated by a D.C. motor, said circuit including a shaping circuit incorporating a phase-locked loop as described above, means for counting the number of oscillations in the signal delivered by the shaping circuit, and means for comparing the number of counted oscillations with a reference value in order to control motor stopping.

Figure 4:
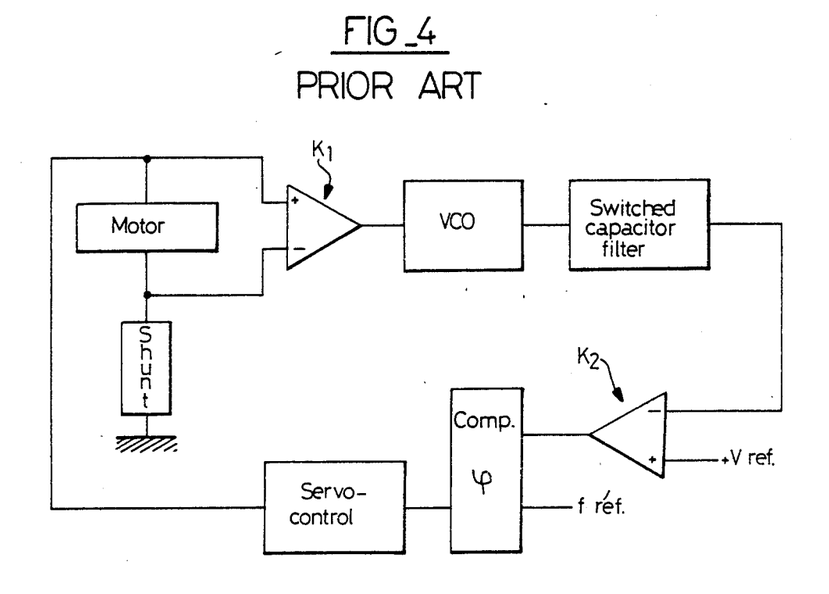

The Applicant wishes to mention that the document Elektronik No. 25, pp. 71-72 (unkonventionelle Drehzahlmessung und -regelung bei Gleichstrommotoren) describes a servo-control circuit for a D.C. motor which bears certain structural similarities with the present invention. The circuit described in this document is illustrated in accompanying FIG. 4. FIG. 4 shows a shunt resistance connected in series with the armature of a D.C. motor. A comparator $K_1$ receives the motor feed voltage on one input and the voltage taken from the terminals of the shunt on its other input. The voltage delivered by the comparator $K_1$ is applied to a voltage controlled oscillator (VCO) which in turn controls a switched capacitor filter. The signal delivered by the filter is applied to a first input of a second comparator $K_2$. The second input of the comparator $K_2$ receives a reference voltage Vref. The signal delivered by the comparator $K_2$ is applied to the first input of a phase comparator. The second input of the phase comparator receives a reference frequency. The output signal from the phase comparator is used to control a motor feed voltage servo-control circuit.

It will be observed, however, that the above-mentioned Elektronik document does not teach the use of a phase-locked loop, nor does it teach counting ripples in the armature current of a D.C. motor. Indeed, counting such armature current ripples is of no particular interest in the context of the Elektronik document since the specific purpose of this document is to regulate the speed of rotation of the motor.

BRIEF DESCRIPTION OF THE DRAWINGS

Embodiments of the invention are described by way of example with reference to the accompanying drawings, in which.

DETAILED DESCRIPTION

Figure 5:
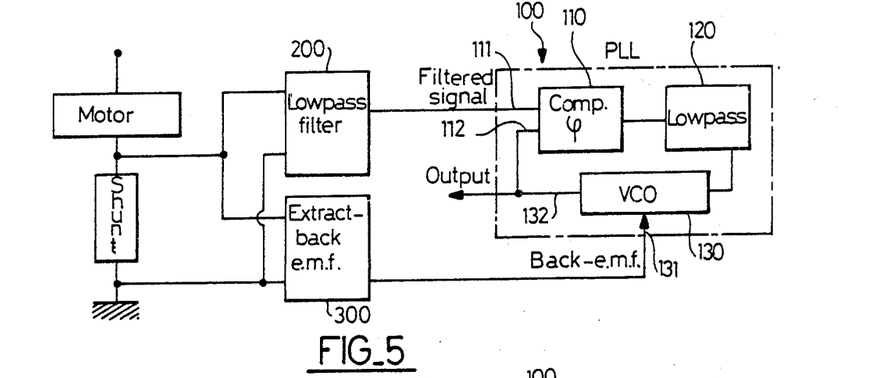
FIGS. 5, 6, and 7 are block diagrams of three variant embodiments of a shaping circuit in accordance with the present invention.
Figure 6:
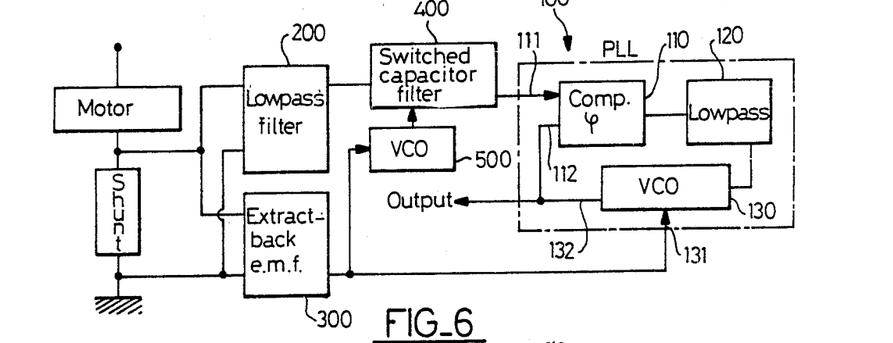
Figure 7:
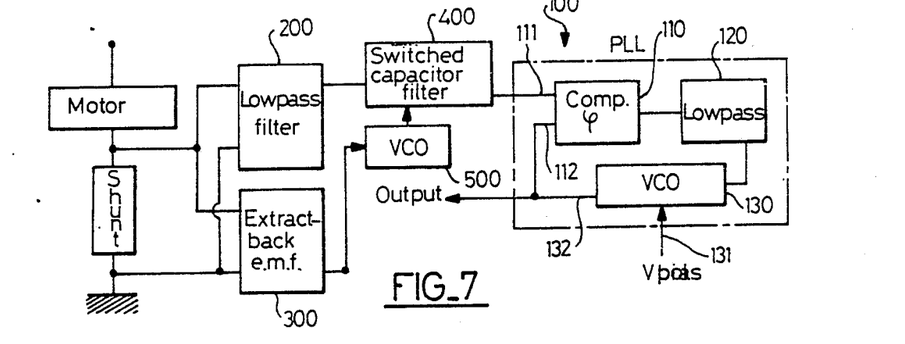

Each of the three shaping circuits shown in accompanying FIGS. 5, 6, and 7 includes a phase-locked loop (PLL) 100.

It is recalled that a phase-locked loop comprises a phase comparator 110, a lowpass filter 120, and a voltage controlled oscillator 130. The phase comparator 110 has a first input 111 connected to receive the signal to be processed and a second input 112 connected to receive the signal from the output 132 of the oscillator 130.

The output signal from the phase comparator 110 is applied to the input of the lowpass filter 120. The output from the lowpass filter 120 controls the oscillator 130. The output from the phase-locked loop 100 is constituted by the output 132 of the voltage controlled oscillator 130.

Accompanying FIGS. 5, 6, and 7 show, in highly diagrammatic form, a shunt resistance connected in series with the armature of a D.C. motor. The voltage taken across the terminals of the shunt is thus directly proportional to the armature current of the D.C. motor.

All three of the shaping circuits in accordance with the present invention and as shown in FIGS. 5, 6, and 7 respectively include a lowpass filter 200 and a circuit 300 for extracting a signal representative of the back electromotive force (back-e.m.f.). Both the input of the lowpass filter 200 and the input of the circuit 300 are connected across the terminals of the shunt.

In the first variant embodiment shown in accompanying FIG. 5, the ripple in the armature current, after filtering by the lowpass filter 200, is applied to the input of the phase-locked loop 100, and more precisely to the input 111 of the phase comparator 110, while the oscillator 130 is controlled via an auxiliary input 131 by the signal delivered by the circuit 300. Thus, the center frequency of the phase-locked loop 100 is controlled to be as close as possible to the fundamental frequency of the armature current ripple. This arrangement prevents the phase-locked loop 100 from lacking on to a harmonic.

In the second variant embodiment shown in accompanying FIG. 6, the armature current ripple as filtered by the lowpass filter 200 is passed through a switched capacitor filter 400 prior to being applied to the input 111 of the phase-locked loop 100. The switched capacitor filter 400 is controlled by a voltage controlled oscillator 500 which is in turn controlled via an input connected to receive the signal delivered by the circuit 300 for extracting the back-e.m.f.

The voltage controlled oscillator 130 of the phase-locked loop 100 continues to be controlled by the signal delivered by the circuit 300.

The switched capacitor filter 400 may be of the lowpass type or of the bandpass type. The cut-off frequency of this switched capacitor filter 400 is controlled by the VCO 500 to be proportional to the basic ripple in the armature current and serves to attenuate the harmonics in the signal applied to the input 111 of the phase-locked loop 100.

In the third variant embodiment of the present invention shown in FIG. 7, the current ripples delivered by the lowpass filter 200 also passes through a switched capacitor filter 400 prior to being applied to the input 111 of the phase-locked loop 100. The switched capacitor filter 400 is likewise controlled by a VCO 500 which in turn has its control input connected to receive the signal delivered by the circuit 300 for extracting the back-e.m.f. In contrast, in this third embodiment of the invention, the VCO 130 of the phase-locked loop 100 is no longer controlled by the signal delivered by the circuit 300, but is controlled by a bias voltage Vbias defined to center the frequency of the phase-locked loop 100 on the expected center frequency of the armature current ripple and to open the passband of the phase-locked loop 100.

In all three embodiments shown in FIGS. 5, 6, and 7, the output from the shaping circuit is constituted by the output from the phase-locked loop 100, i.e. the output 132 of the VCO 130. The signal obtained at the output 132 of the phase-locked loop 100 corresponds to a logic signal which coincides with the periodic component of the armature current generated by the commutator switching in the D.C. motor.

The first variant embodiment shown in FIG. 5 is now described with reference to the detailed circuit diagram of accompanying FIG. 8.

Figure 8:
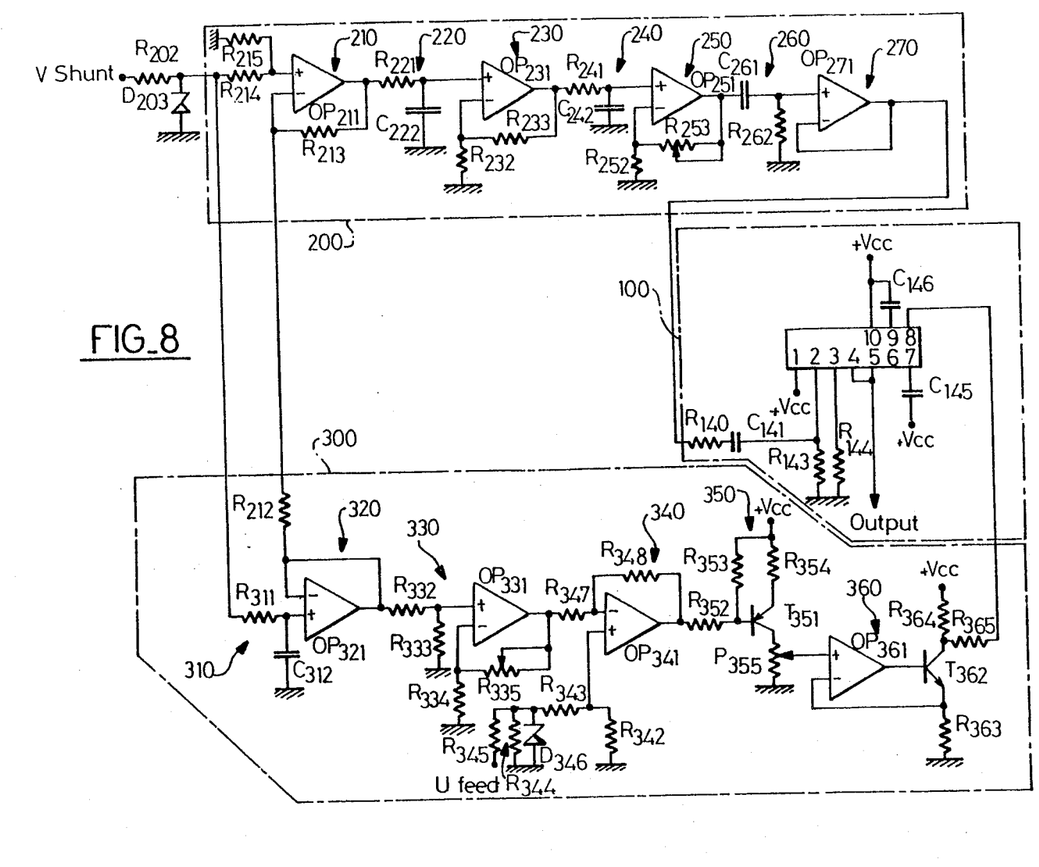
FIGS. 8, 9, and 10 are respective detailed circuit diagrams of these three variant embodiments.

The shaping circuit shown in FIG. 8 includes an input protection cell comprising a resistor R 202 and a zener diode D 203. The voltage Vshunt taken from the terminals of the shunt resistance connected in series with the motor armature is applied to a first terminal of the resistor R 202. The zener diode D 203 connects the second terminal of the resistor R 202 to ground. This second terminal of the resistor R 202 is also connected to the inputs of the lowpass filter 200 and of the circuit 300.

The input protection cell R 202 - D 203 prevents voltage surges being applied to the circuits 200 and 300.

The circuit 200 comprises the following series connection between the protection cell R 202 - D 203 and the phase-locked loop 100: a subtractor stage 210; a lowpass filter 220; an amplifier stage 230; a lowpass stage 240; an amplifier stage 250; a highpass stage 260; and a voltage follower amplifier stage 270.

The circuit 300 comprises the following series connection between the protection cell R 202 - D 203 and the phase-locked loop 100: a lowpass filter 310; a voltage follower amplifier stage 320; an amplifier stage 330;

a subtractor stage 340; an inverter stage 350; and a voltage-to-current transformation stage 360.

The stage 320 includes an operational amplifier OP 321.

The lowpass filter 310 comprises a resistor R 311 and a capacitor C 312. The resistor R 311 has one end connected to the common point between the resistor R 202 and the zener diode D 203, and has its other end connected to the non-inverting input of the operational amplifier 321. The capacitor C 312 is connected between circuit ground and the non-inverting input of the operational amplifier OP 321.

The output of the operational amplifier OP 321 is looped back directly to its inverting input. As a result, the voltage follower amplifier stage 320 generates an output signal representative of the mean armature current.

The stage 210 includes an operational amplifier OP 211. The inverting input of the operational amplifier 211 is connected to the output of operational amplifier OP 321 via a link resistor R 212.

The output of the operational amplifier OP 211 is looped back to its inverting input via a resistor R 213. The non-inverting input of operational amplifier OP 211 is connected firstly via a resistor R 214 to the common point between the resistor R 202 and the diode D 203, and secondly via a resistor R 215 to circuit ground.

The subtractor stage 210 serves to subtract the mean component of the armature current as delivered by the follower amplifier stage 320 from the signal taken across the terminals of the shunt. As a result, the signal delivered by the subtractor stage 210 represents the periodic components of the armature current.

The lowpass filter 220 comprises a resistor R 221 and a capacitor C 222.

The amplifier stage 230 comprises an operational amplifier OP 231 and two resistors R 232 and R 233.

The resistor R 221 connects the output of operational amplifier OP 211 to the non-inverting input of operational amplifier OP 231.

The inverting input of operational amplifier OP 231 is connected to circuit ground via a resistor R 232. In addition, the output of additional amplifier OP 231 is looped back to its inverting input via resistor R 233.

The lowpass filter 241 comprises a resistor R 241 and a capacitor C 242. The amplifier stage 250 comprises an operational amplifier OP 251, a resistor R 252, and a variable resistor R 253. The resistor R 241 connects the output of operational amplifier OP 231 to the non-inverting input of operational amplifier OP 251. The capacitor C 242 is connected between the non-inverting input of operational amplifier OP 251 and circuit ground. The inverting input of operational amplifier OP 251 is connected to circuit ground via resistor R 252. The output of operational amplifier OP 251 is looped back to its inverting input via the variable resistor R 253.

The highpass filter 260 comprises a capacitor C 261 and a resistor R 262.

Amplifier stage 270 comprises an operational amplifier OP 271.

Capacitor C 261 is connected between the output of operational amplifier OP 251 and the non-inverting input of operational amplifier OP 271.

The non-inverting input of operational amplifier OP 271 is connected to circuit ground via resistor R 262.

The output of operational amplifier OP 271 is looped back directly to the inverting input thereof.

Amplifier stage 330 includes an operational amplifier OP 331. The non-inverting input thereof is connected firstly to the output of operational amplifier OP 320 via a resistor R 332, and secondly to circuit ground via a resistor R 333.

The inverting input of operational amplifier OP 331 is connected to circuit ground via a resistor R 334. The output of operational amplifier OP 331 is looped back to its inverting input via an adjustable resistor R 335.

Subtractor stage 340 serves to subtract a signal representative of the product of the mean armature current multiplied by the sum of the shunt resistance and the internal resistance of the D.C. motor from the feed voltage applied to the motor.

Subtractor stage 340 includes an operational amplifier OP 341. The non-inverting input of the operational amplifier OP 341 receives a signal related to the feed voltage of the D.C. motor.

This non-inverting input of OP 341 is connected to circuit ground via a resistor R 342. The non-inverting input of OP 341 is also connected to the first terminal of a resistor R 343. The second terminal of the resistor R 343 is connected to circuit ground via a cell comprising a parallel-connected resistor R 344 and zener diode D 346. In addition, the second terminal of resistor R 343 is connected to the motor feed voltage Ufeed via a resistor R 345.

The inverting input of OP 341 is connected to the output of OP 331 via a resistor R 347. The output of OP 341 is also looped back to its inverting input via a resistor R 348.

Inverter stage 350 comprises a PNP transistor T 351. The base of transistor T 351 is connected to the output of OP 341 via a resistor R 352. The base of transistor T 351 is also connected to a positive power supply terminal +Vcc via a resistor R 353. The emitter of T 351 is connected to said terminal +Vcc via a resistor R 354. The collector of T 351 is connected to circuit ground via a potentiometer P 355. The voltage-to-current transformation stage 360 includes an operational amplifier OP 361 and an NPN transistor T 362.

The slider of potentiometer P 355 is connected to the non-inverting input of OP 361. The output of OP 361 is connected to the base of transistor T 362. The emitter of T 362 is connected to the inverting input of OP 361. In addition, the emitter of T 362 is connected to circuit ground via a resistor R 363. The collector of T 362 is connected to the positive power supply terminal +Vcc via a resistor R 364.

The signal representative of the ripple in the armature current generated by commutator switching in the D.C. motor as filtered by the lowpass filter 200 and suitable for application to the input of phase-locked loop 100 is available at the output of OP 271. In addition, the signal representative of the back-e.m.f. of the motor for controlling the VCO of the phase-locked loop 100 is available at the collector of transistor T 362.

In the embodiment shown in accompanying FIG. 8, the phase-locked loop 100 is constituted by an integrated circuit of type LM 565.

Input 111 of the phase-locked loop 100 shown in FIGS. 5, 6, and 7 corresponds to pin 2 of the circuit LM 565. This pin 2 is connected to the output of OP 271 via a circuit comprising a resistor R 140 connected in series with a capacitor C 141. The control input of the VCO 130 integrated in the phase-locked loop 100 and referenced 131 in FIGS. 5, 6, and 7 corresponds to pin 8 of the circuit LM 565. This pin 8 is connected to the collector of transistor T 362 via resistor R 365. As shown in accompanying FIG. 8, it may be observed that it is also preferable for the circuit LM 565 which constitutes the phase-locked loop 100 to have its pin 1 connected to a positive power supply +Vcc, its input pin 2 connected to circuit ground via a resistor R 143, its pin 3 connected to circuit ground via a resistor R 144, its pin 7 connected to a positive power supply terminal +Vcc via a capacitor C 145, its pin 9 connected to a positive power supply source +Vcc via a capacitor C 146, and its pin 10 connected directly to the same positive power supply source +Vcc.

The output from the shaping circuit is taken directly from interconnected output pins 4 and 5 of the circuit LM 565.

Figure 9:
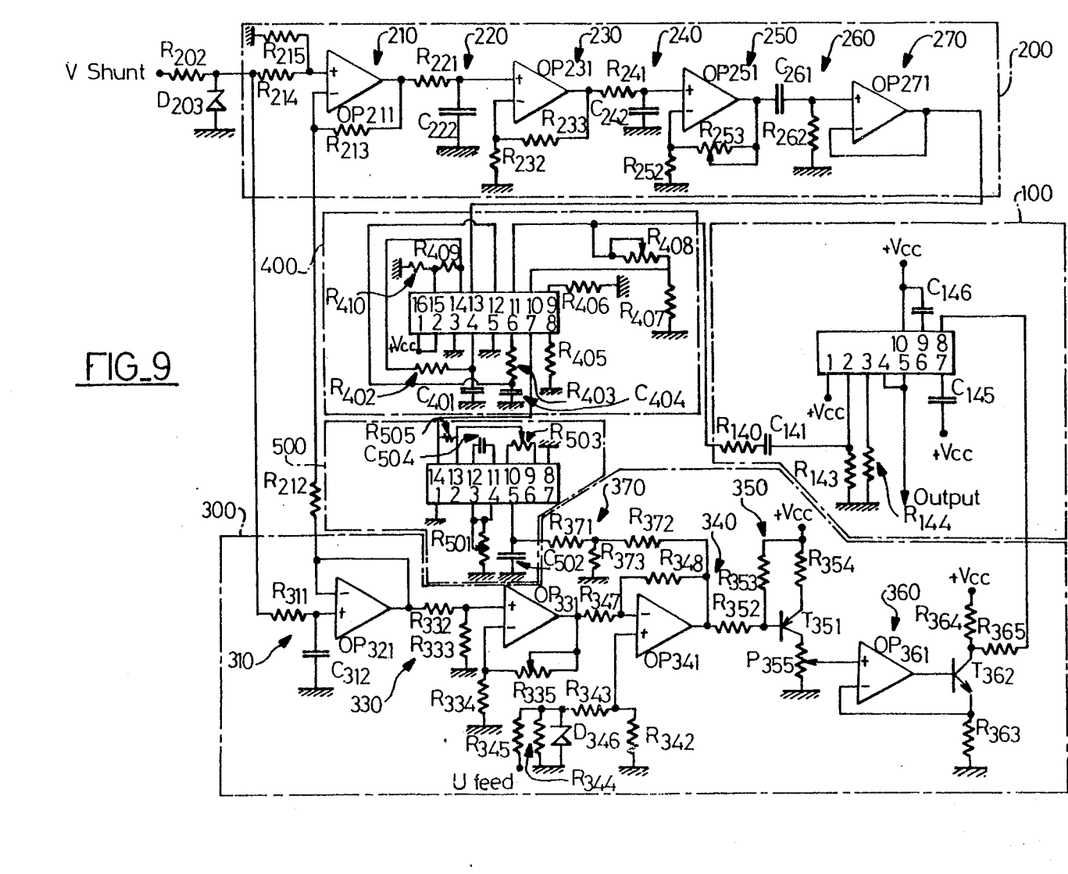

The second embodiment of the present invention is now described in greater detail as shown in accompanying FIG. 9.

The shaping circuit shown in accompanying FIG. 9 comprises an input protection cell R 202 - D 203, a lowpass filter 200, a back-e.m.f. extractor circuit 300, and a phase-locked loop 100 which are identical to the first embodiment shown in FIG. 8 and described above. As a result these items are not described again below.

However, in the second embodiment shown in FIG. 9, the oscillations in the armature current as filtered by the circuit 200 are no longer applied directly to the input of the phase-locked loop 100, but transit through the switched capacitor filter 400 prior to reaching the phase-locked loop 100.

As mentioned above with respect to FIG. 6, the switched capacitor filter 400 is itself controlled by a VCO 500.

The switched capacitor filter 400 may be constituted by an integrated circuit of type TSG 8550, and the associated VCO 500 may be formed by an integrated circuit of type AD 537.

The control input of VCO circuit AD 537 corresponds to pin 5 thereof. This pin is connected to the output of operational amplifier OP 341 via a resistor scaling stage 370. This stage comprises three resistors R 371, R 372, and R 373. Resistors R 372 and R 373 are connected in series between the output of OP 341 and ground. Resistor R 371 is connected between the point common to resistors R 372 and R 373 and pin 5 of the VCO circuit 500.

The output of VCO circuit AD 537 is on pin 14. The control input of the switched capacitor filter TSG 8550 is constituted by pin 7 thereof. As a result, pin 14 of VCO AD 537 is connected to pin 7 of switched capacitor filter TSG 8550.

The filter input of switched capacitor filter 400 is constituted by pin 13 of this circuit. As a result pin 13 of the switched capacitor filter TSG 8550 is connected to the output of the filter circuit 200, i.e. to the output of OP 271.

Finally, the output of switched capacitor filter TSG 8550 is constituted by pin 11 thereof. As a result pin 11 of the switched capacitor filter TSG 8550 is connected to input pin 2 of the phase-locked loop 100 which is constituted by the circuit LM 565 via the series connection R 140 and C 141.

It may also be observed that it is preferable for the VCO 500 controlling the switched capacitor filter 400 and constituted by a circuit AD 537 to have its pin 1 connected to circuit ground, its pins 3 and 4 connected to each other and connected to circuit ground via an adjustable resistor R 501, its control input 5 connected to circuit ground via a capacitor C 502, its pin 8 connected to circuit ground, its pins 9 and 10 connected to each other via a potentiometer R 503, its pins 11 and 12 connected to each other via a capacitor C 504, and its pin 13 connected to the slider of potentiometer R 503 and also connected to output pin 14 via a resistor R 505.

Similarly, the switched capacitor filter 400 constituted by a TSG 8550 circuit has its pins 1 and 2 connected together to a positive power supply +Vcc, its pins 3 and 5 connected together to circuit ground, its pin 4 connected to ground via a capacitor C 401, and to its pin 14 via a resistor R 402, its pin 6 connected to its pin 12 via a resistor R 403, and said pin 12 also connected to ground via a capacitor C 404, its pin 8 connected to circuit ground via a resistor R 405, its pin 9 connected to circuit ground via a resistor R 406, its output pin 10 connected to circuit ground via a resistor R 407 and also connected to its output pin 11 via an adjustable resistor 408, and its pin 15 connected firstly to pin 14 via a resistor R 409 and secondly to ground via a resistor R 410.

Resistors R 409 and R 410 determine the gain of an amplifier stage integrated in the circuit TSG 8550. The circuit cell R 402 - C 401 serves as a lowpass filter for the signal delivered by said integrated amplifier stage. Circuit cell R 403 - C 404 serves as a second lowpass filter stage for the signal. Resistors R 406, R 407, and R 408 determine the gain of the output amplifier stage of the circuit TSG 8550.

Figure 10:
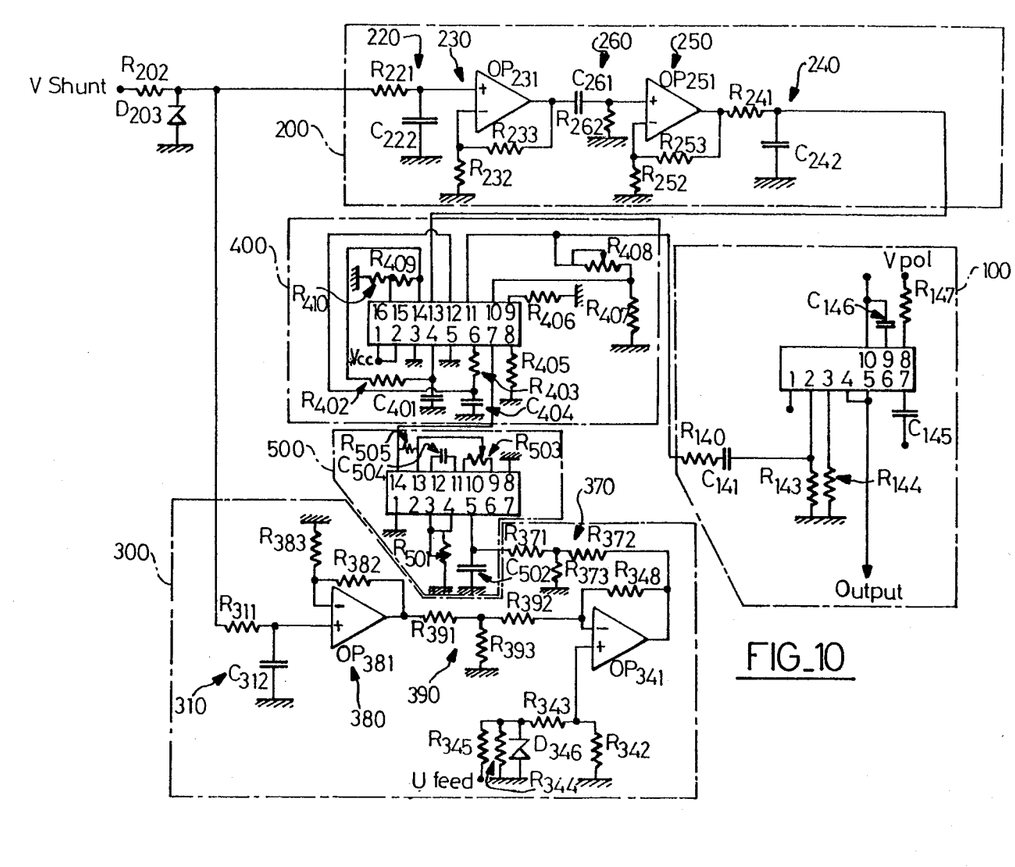

The third embodiment of the present invention is now described with reference to the accompanying FIG. 10.

As mentioned above with reference to FIG. 7, this third embodiment of the present invention includes a lowpass filter circuit 200, a circuit 300 for extracting the back-e.m.f. of the motor, a phase-locked loop 100, a switched capacitor filter 400, and a VCO 500 controlling the switched capacitor filter 400. The circuit also includes an input protection cell constituted by resistor R 202 and zener diode D 203 in the same manner as the embodiments shown in FIGS. 8 and 9.

The phase-locked loop 100, the switched capacitor filter 400, and the controlling VCO 500 may be constituted by circuits of types LM 565, TSG 8550, and AD 537 in exactly the same manner as described above with reference to FIG. 9.

The filter circuit 200 may comprise a lowpass stage 220, an amplifier statge 230, a highpass stage 260, an amplifier stage 250, and a lowpass stage 240, similar to the corresponding stages of the lowpass filter 200 shown in FIG. 8 and described above. It should, however, be observed that the lowpass filter 200 shown in FIG. 10 differs from the lowpass filter 200 shown in FIG. 8 in that the following circuits are omitted: the input subtractor stage 210 and the output voltage follower amplifier stage 270, and in that lowpass stage 240 and highpass stage 260 are interchanged.

The circuit 300 for extracting the back-e.m.f. of the motor comprises the following in cascade: an input lowpass stage 310 identical to the stage 310 shown in FIG. 8; an amplifier stage 380; a scaling stage 390; and a subtractor stage 340 identical to the subtractor stage 340 shown in FIG. 8.

The amplifier stage 380 includes an operational amplifier OP 381. The non-inverting input of OP 381 is connected to the output of lowpass stage 310. The inverting input of OP 381 is connected to ground via resistor R 383, and is also connected to the output of OP 381 via resistor R 382. The scaling stage 390 comprises three resistors R 391, R 392, and R 393.

Resistors R 391 and R 393 are connected in series between the output of OP 381 and ground. Resistor R 392 connects the common point of resistors R 391 and R 393 to the inverting input of OP 341.

The output of OP 341 is connected to input pin 5 of the controlling VCO circuit AD 537 via the scaling stage 370. Output pin 14 of the VCO circuit AD 537 is connected to control input 7 of the switched capacitor filter TSG 8550. Input pin 13 of the switched capacitor filter receives the signal delivered by lowpass filter 200, and more precisely by the output stage 240 thereof. The oscillations in the armature current as filtered by the switched capacitor filter 400 are made available on output pin 11 thereof. This output pin 11 is connected to the input terminal of the phase-locked loop 100 (pin 2 of circuit LM 565) via a series-connected branch R 140 - C 141.

It may be observed that compared with FIGS. 8 and 9, the inverter stage 350 and the voltage-to-current transformation stage 360 are omitted.

The phase-locked loop 100 is therefore no longer controlled by a signal which is proportional to the back-e.m.f. of the motor, but by a reference potential Vbias which is applied to input 131 (pin 8 of the circuit LM 565) via a resistor R 147.

The potential Vbias and the resistor R 147 are determined so as to center the frequency of the phase-locked loop 100 on the center frequency of the ripple in the armature current.

As mentioned above, the above-described circuit for shaping armature current ripple may be integrated in a circuit for making use thereof and comprising means for counting the number of oscillations in the signal from the shaping circuit (output 132 of VCO 130 in FIGS. 5, 6, and 7, pins 4 and 5 of circuit LM 565 in FIGS. 8, 9, and 10), together with means for comparing the number of oscillations as counted with a reference value in order to control the stopping of the motor.

The counter means and the comparator means may be identical to the dispositions described in above-mentioned published French patent application FR-A-2 585 200.

That is why the counter means and the comparator means are not described in greater detail below.

However, it may be observed that the motor does not stop instantaneously, i.e. the motor continues to rotate because of inertia after a stop instruction has been applied thereto by switching off its feed voltage. That is why it is necessary to anticipate motor standstill by a number of oscillations corresponding to the oscillations which occur during the inertia stage after the stop signal has been applied. This number of oscillations generated during the inertia stage is generally fixed and may be determined experimentally.

However, such control by anticipation may give rise to a positioning error corresponding to plus or minus one oscillation. Such an error is negligible on its own, but it ceases to be negligible if it is in danger of accumulating. In order to eliminate this drawback, it may therefore be advantageous to count the real number of oscillations actually generated while the motor is stopping, in order to establish the real position of the motor. Account must then be taken of the fact that while it is stopping, the motor operates as a generator. During this stopping stage, the circuit 300 for extracting the back-e.m.f. and shown in FIGS. 8, 9, and 10 (which includes, in particular, a subtractor stage 340 for subtracting a signal representative of the product of the mean armature current multiplied by the sum of the shunt resistance and the internal resistance of the D.C. motor from the feed voltage applied to the motor) needs to be replaced by an auxiliary circuit for extracting the back-e.m.f. and generating a signal proportional to the product of the mean armature current multiplied by the sum of the shunt resistance and the internal resistance of the D.C. motor. In other words, when monitoring the signal generated by a motor which is stopping, the circuit 300 for extracting the back-e.m.f. is switched from a configuration generating a signal proportional to U - (R+r).i to a configuration generating a signal proportional to (R+r).i, where U represents the motor feed voltage, R the shunt resistance, r the internal resistance of the D.C. motor, and i the average armature current.

Naturally the present invention is not limited to the particular embodiments described above but extends to any variant lying within its scope. In particular, specific reference to the circuits of types LM 565, AD 537, and TSG 8550, should not be taken as being limiting.

I claim:

1. A circuit for shaping ripple in D.C. motor armature current, wherein the circuit includes;
    a phase-locked loop comprising;
    a phase comparator having two inputs and an output;
    a first voltage controlled oscillator having a main input, a control input and an output, said output of the first voltage controlled oscillator being connected to a first input of the phase comparator; and
    a first lowpass filter connected between the output of said phase comparator and the main input of said voltage controlled oscillator;
    means for sensing armature current of a D.C. motor having a mean back-electro-motive force;
    a second lowpass filter having an input connected to the sensing means and generating an output signal to be applied to the second input of the phase comparator; and
    means connected to the sensing means for generating a signal proportional to the mean back-electro-motive force of the motor, said signal proportional to the mean back-electro-motive force being applied to the control input of the voltage controlled oscillator for controlling the frequency of the phase-locked loop,
    wherein the output of the shaping circuit is the output of the first voltage controlled oscillator.

2. A circuit according to claim 1 wherein said sensing means is a shunt resistance connected in series with the motor armature.

3. A circuit according to claim 1 wherein the output of the second lowpass filter is connected to the second input of the phase comparator.

4. A circuit according to claim 1, including a second voltage controlled oscillator controlled by the signal proportional to the back-electro-motive force, and a switched capacitor filter controlled by the output from the second oscillator and connected between the output of the second lowpass filter and the second input of the phase comparator.

5. A circuit according to claim 1, wherein said second lowpass filter comprises a plurality of amplifier stages and lowpass filter stages.

6. A circuit according to claim 5, wherein a highpass filter stage is associated with the second lowpass filter.

7. A circuit according to claim 1, wherein said means suitable for generating a signal proportional to the back-electro-motive force of the motor includes a substractor stage suitable for subtracting a signal proportional to the motor armature current from the motor feed voltage.

8. A circuit according to claim 4, wherein the switched capacitor filter is a lowpass filter.

9. A circuit according to claim 4, wherein the switched capacitor filter is a bandpass filter.

10. A circuit for making use of current ripple generated by a D.C. motor, wherein the circuit comprises:
a shaping circuit including a phase-locked loop in accordance with claim 1;
means for counting the number of oscillations in the signal delivered by the shaping circuit; and
means suitable for comparing the counted number of oscillations with a reference value for controlling the stopping of the motor.

11. A circuit for shaping ripple in D.C. motor armature current comprising:
a phase locked loop including:
a phase comparator having two inputs and an output;
a first voltage controlled oscillator having a main input, a control input and an output, said output of the first voltage controlled oscillator being connected to a first input of the phase comparator; and
a first low pass filter connected between the output of said phase comparator and the main input of said voltage controlled oscillator;
said circuit further comprising:
means for sensing armature current of a D.C. motor having a mean back electromotive force;
a second lowpass filter having an input connected to the sensing means and generating an output signal to be applied to the second input of the phase comparator; and
a second voltage controlled oscillator having a control input and an output;
means connected to the sensing means for generating a signal proportional to the mean back-electromotive force being applied to the control input of the second voltage controlled oscillator; and
a switched capacitor filter controlled by the output from the second voltage controlled oscillator and connected between the output of the second lowpass filter and the second input of the phase comparator,
wherein the output of the shaping circuit is the output of the first voltage controlled oscillator.

12. A circuit according to claim 11 wherein said sensing means is a shunt resistance connected in series with the motor armature.

13. A circuit according to claim 11 wherein the signal proportional to the back-electro-motive force is also applied to the control input of the first oscillator.

14. A circuit according to claim 11 wherein the control in put of the first oscillator receives a bias voltage.

15. A circuit according to claim 11 wherein said first lowpass filter comprises a plurality of amplifier stages and lowpass filter stages.

16. A circuit according to claim 15 wherein a highpass filter stage is associated with the first lowpass filter.

17. A circuit according to claim 11 wherein said means suitable for generating a signal proportional to the back-electro-motive force of the motor includes a substractor stage suitable for substracting a signal proportional to the motor armature current form the motor feed voltage.

18. A circuit according to claim 11 wherein the switched capacitor filter is a lowpass filter.

19. A circuit according to claim 11 wherein the switched capacitor filter is a bandpass filter.

20. A circuit for making use of current ripple generated by a D.C. motor, wherein the circuit comprises:
a shaping circuit including a phase-locked loop in accordance with claim 11;
means for counting the number of oscillations in the signal delivered by the shaping circuit; and means suitable for comparing the counted number of oscillations with a reference value for controlling the stopping of the motor.

* * * * *